(12) United States Patent
Damen et al.

(10) Patent No.: US 8,729,722 B2
(45) Date of Patent: May 20, 2014

(54) WIND TURBINE AND METHOD FOR MONITORING THE GAP LENGTH BETWEEN A ROTOR AND A STATOR OF THE WIND TURBINE GENERATOR

(75) Inventors: Michiel Eduard Cornelis Damen, The Hague (NL); Herman Luimes, Dieren (NL)

(73) Assignee: XEMC Darwind B.V., Capelle Aan Den Ijssel (NL)

( * ) Notice: Subject to any disclaimer, the term of this patent is extended or adjusted under 35 U.S.C. 154(b) by 309 days.

(21) Appl. No.: 13/141,550

(22) PCT Filed: Dec. 17, 2009

(86) PCT No.: PCT/EP2009/067396
§ 371 (c)(1),
(2), (4) Date: Aug. 16, 2011

(87) PCT Pub. No.: WO2010/072645
PCT Pub. Date: Jul. 1, 2010

(65) Prior Publication Data
US 2011/0291415 A1  Dec. 1, 2011

(30) Foreign Application Priority Data
Dec. 23, 2008 (EP) .................................... 08172789

(51) Int. Cl.
*F03D 9/00* (2006.01)
*H02K 11/00* (2006.01)
(52) U.S. Cl.
USPC .......................................... 290/55; 310/68 B
(58) Field of Classification Search
USPC .............................. 290/44, 55; 310/68 R, 68 B
See application file for complete search history.

(56) References Cited

U.S. PATENT DOCUMENTS 4,361,776 A * 11/1982 Hayashi et al. ............... 310/268
4,785,242 A * 11/1988 Vaidya et al. ............ 324/207.25
(Continued)

FOREIGN PATENT DOCUMENTS

| EP | 1870566 | 12/2007 |
| WO | WO 0060719 | 12/2000 |
| WO | WO 02/33254 | 4/2002 |

OTHER PUBLICATIONS

Official Search Report of the European Patent Office in counterpart foreign application No. PCT/ EP2009/067396 filed Dec. 17, 2009.

(Continued)

*Primary Examiner* — Tulsidas C Patel
*Assistant Examiner* — Viet Nguyen
(74) *Attorney, Agent, or Firm* — Steven M. Koehler; Westman, Champlin & Koehler, P.A.

(57) ABSTRACT

Wind turbine comprising a generator section with a generator rotor and a generator stator. A first air gap is defined between a first surface of the generator rotor and the stator, and magnets and electro conductive windings are provided at opposite sides of the first air gap to create a magnetic field over the first air gap during operation. The wind turbine comprises distance measurement means arranged to measure the radial length of a second air gap defined between a second surface of the generator rotor and a stationary part of the generator section. The second air gap is located at a radial distance from the first air gap at a position where there is no interference of a magnetic field generated by the magnets over the first air gap, and the length of the second air gap corresponds directly to the length of the first air gap. This enables accurate measurement and monitoring of the air gap length. A method for monitoring the gap length between a rotor and a stator of a wind turbine generator is also disclosed.

16 Claims, 2 Drawing Sheets

(56) References Cited

U.S. PATENT DOCUMENTS

| | | | |
|---|---|---|---|
| 6,191,513 B1* | 2/2001 | Chen et al. ............... 310/90 |
| 6,553,091 B2* | 4/2003 | Takanashi et al. ............... 378/15 |
| 6,628,028 B2* | 9/2003 | Yoshida et al. ............... 310/91 |
| 6,781,276 B1 | 8/2004 | Stiesdal |
| 6,794,781 B2* | 9/2004 | Razzell et al. ............... 310/114 |
| 7,154,191 B2* | 12/2006 | Jansen et al. ............... 290/55 |
| 7,202,580 B2* | 4/2007 | Yokoyama et al. ......... 310/68 B |
| 7,245,051 B2* | 7/2007 | Hosono et al. ............... 310/68 B |
| 7,250,701 B2* | 7/2007 | Yoshiyama et al. ........ 310/68 B |
| 7,294,944 B2* | 11/2007 | Fujii ............... 310/67 R |
| 7,589,444 B2* | 9/2009 | Teshima et al. ............. 310/68 B |
| 7,944,074 B2* | 5/2011 | Longtin et al. ............... 290/55 |
| 8,106,548 B2* | 1/2012 | Takeuchi ............... 310/68 B |
| 8,125,095 B2* | 2/2012 | Duffey et al. ............... 290/44 |
| 8,178,988 B2* | 5/2012 | Numajiri ............... 290/44 |
| 8,247,916 B2* | 8/2012 | Numajiri ............... 290/44 |
| 8,264,097 B2* | 9/2012 | Numajiri ............... 290/55 |
| 8,274,191 B2* | 9/2012 | Stiesdal ............... 310/216.113 |
| 2004/0041407 A1 | 3/2004 | Pettersen |
| 2004/0247438 A1 | 12/2004 | McCoin |
| 2004/0256926 A1* | 12/2004 | Miyamoto ............... 310/68 B |
| 2005/0082839 A1 | 4/2005 | McCoin |
| 2006/0108881 A1* | 5/2006 | Hauger et al. ............. 310/68 B |
| 2006/0152014 A1* | 7/2006 | Grant et al. ............. 290/55 |
| 2007/0292260 A1* | 12/2007 | Bagepalli et al. ............. 415/14 |
| 2008/0164697 A1* | 7/2008 | Schram et al. ............. 290/44 |
| 2008/0258668 A1* | 10/2008 | Oguri et al. ............. 318/538 |
| 2010/0045047 A1* | 2/2010 | Stiesdal ............. 290/55 |
| 2010/0244446 A1* | 9/2010 | Qu et al. ............. 290/46 |
| 2010/0264768 A1* | 10/2010 | Alfermann et al. ............. 310/90 |
| 2011/0109100 A1* | 5/2011 | Versteegh ............. 290/1 B |
| 2011/0187122 A1* | 8/2011 | Martinez et al. ............. 290/55 |
| 2012/0049535 A1* | 3/2012 | Versteegh ............. 290/55 |
| 2012/0062162 A1* | 3/2012 | Takeuchi et al. ......... 318/400.38 |

OTHER PUBLICATIONS

Written Opinion of the European Patent Office in counterpart foreign application No. PCT/ EP2009/067396 filed Dec. 17, 2009.

* cited by examiner

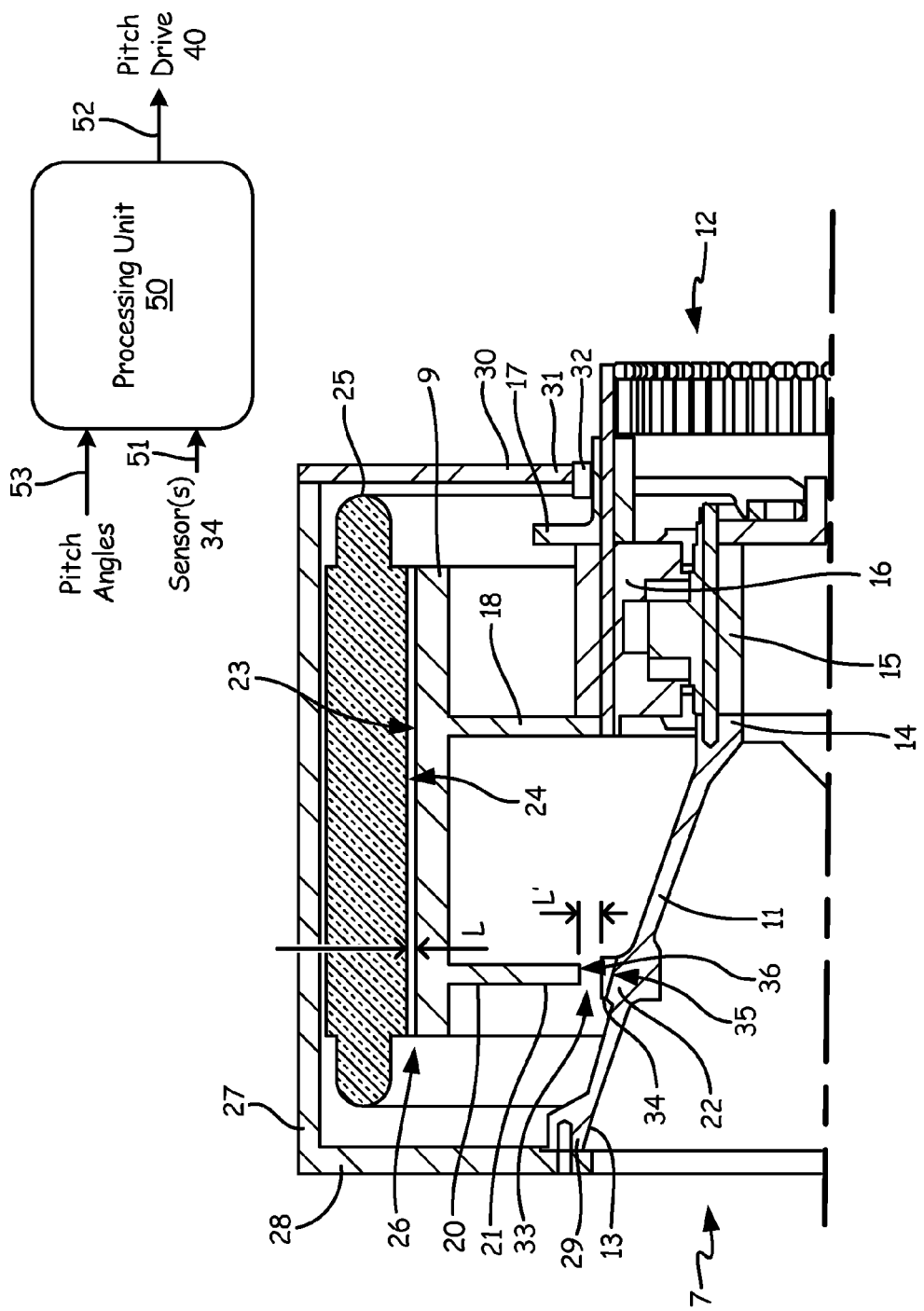

WIND TURBINE AND METHOD FOR MONITORING THE GAP LENGTH BETWEEN A ROTOR AND A STATOR OF THE WIND TURBINE GENERATOR

CROSS-REFERENCE TO RELATED APPLICATION

This application is a Section 371 National Stage Application of International Application PCT/EP2009/067396 filed Dec. 17, 2009 and published as WO/2010/072645 in English.

BACKGROUND

The discussion below is merely provided for general background information and is not intended to be used as an aid in determining the scope of the claimed subject matter.

Aspects of the present invention relate to a wind turbine comprising a generator with a generator rotor and a stator, with a gap between the stator and the generator rotor and with magnets and electro-conductive windings at opposite sides of the gap. Aspects of the invention also relate to a method of monitoring the length of the gap, particularly during operation of the wind turbine.

Generally, a wind turbine generator includes a rotor having two or three blades, although turbines with one blade or four or more blades also exist. The rotor is typically mounted to a shaft within a nacelle on top of a tower. The blades, attached to a rotatable hub, transform mechanical wind energy into a mechanical rotational torque that drives the generator rotor of a generator. The generator rotor can be coupled to the rotor through a gearbox or the coupling can be gearless, as in so-called direct-drive wind turbines. The generator converts the rotational mechanical energy to electrical energy, which is fed into a utility grid.

Generators typically comprise a generator rotor and a stator which are separated by a cylindrical air gap. During operation, a magnetic field, generated by a plurality of magnets, passes through a portion of the air gap. The magnets can, e.g., be permanent magnets, wound magnets mounted on the rotor, and/or currents induced in the rotor iron. The effective transmission of the magnetic field through the air gap is at least partly dependent on the length of the air gap. In this context, the length of the air gap is the radial distance between the rotor surface and the stator surface.

In operation, loads on the rotor are introduced by wind force via the blades. Such loads can deflect the generator rotor in such a way that the air gap length is changed or becomes nonuniform. If the radial air gap length becomes too small, the rotor and stator components can hit resulting in severe damage to the generator.

EP 1 870 566 A1 discloses a wind turbine with a generator comprising a stator and a rotor. The air gap between the stator and the rotor is measured by a number of sensors and adjusted by blade pitch control. During operation of the wind turbine, strong magnetic flux occurs in the air gap. This hinders accurate and reliable measurement of the air gap length. Moreover, since the sensors are located near the air gap, the sensors cannot be easily replaced.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention is to provide a wind turbine having an air gap measurement system that can accurately measure the length of the generator air gap during operation, notwithstanding the strong magnetic flux.

In one embodiment a wind turbine includes a generator with a rotor and a stator, with a gap between the stator and a first surface of the rotor and with magnets and electro-conductive windings at opposite sides of the gap, wherein the wind turbine comprises one or more distance measurement devices for measuring the distance (L') between a second surface of the rotor and a stationary part of the generator free from magnets and windings and at a radial distance from the gap. This way, the length of the gap can be accurately measured at a location where interference by the magnetic field of the magnets is effectively reduced.

In one embodiment, the distance measurement device is positioned outside the scope of the magnetic field generated by the magnets to measure the distance between the second rotary surface of the rotor and the stationary part of the generator without effective interference of a magnetic field generated by the magnets over the gap. At the location of the distance measurement device the strength of the magnetic field is too little to reduce measurement accuracy to an unacceptable level.

In one embodiment, the generator rotor comprises an outer surface facing a first surface of the stator and an inner surface facing a second surface of the stator to form a second gap outside the scope of the magnetic field generated during operation. This way, the stator encases the rotor. In such a case, the inner surface of the rotor can comprise a flange extending in the direction of the second stator surface. This way, a second gap can be formed at safe distance from the magnetic field generated in the first air gap.

In an alternative embodiment, the stator comprises an outer surface facing a first surface of the generator rotor and an inner surface facing a second surface of the generator rotor to form a second gap outside the scope of the magnetic field generated during operation. In such an embodiment, the stator is enclosed by the generator rotor.

To obtain even more reliable gap length measurements over the full circumference of the air gap, the length of the air gap can for example be measured at two or three or more locations, which may be circumferentially equidistant. If two distance measurement devices are used, they can be arranged to measure the distance in two orthogonal dimensions.

The second air gap can have a length of the same order as the first air gap between the stator and the generator rotor, or it can be smaller or wider, if so desired.

The distance measurement device can for example be a non-contact sensor, such as for example an inductive proximity sensor, a capacitive proximity sensor or an optical distance sensor. Combinations of these types of sensors can also be used.

The wind turbine can also include an air gap adjustment assembly configured to modulate the air gap length responsive to a signal from the distance measurement device. The air gap adjustment assembly can for instance include a pitch drive for adjusting the pitch angle of one or more of the blades. This way, the load on the blades can be reduced or increased and a more uniform load distribution can be obtained, resulting in a more uniform air gap length. The blades can for example be pitched individually or simultaneously.

Such an air gap control system facilitates an efficient and effective mechanical load transfer scheme. It also enhances efficiency and reliability of the generator and can effectively reduce costs for maintenance, repair, and outages of the wind turbine.

BRIEF DESCRIPTION OF THE DRAWING

An embodiment of the present invention will now be described, by way of example only, with reference to the accompanying drawings, in which:

FIG. 2: shows in cross section a first embodiment of an upper half of the generator of the wind turbine in FIG. 1.

DETAILED DESCRIPTION OF THE ILLUSTRATIVE EMBODIMENT

Figure 1:
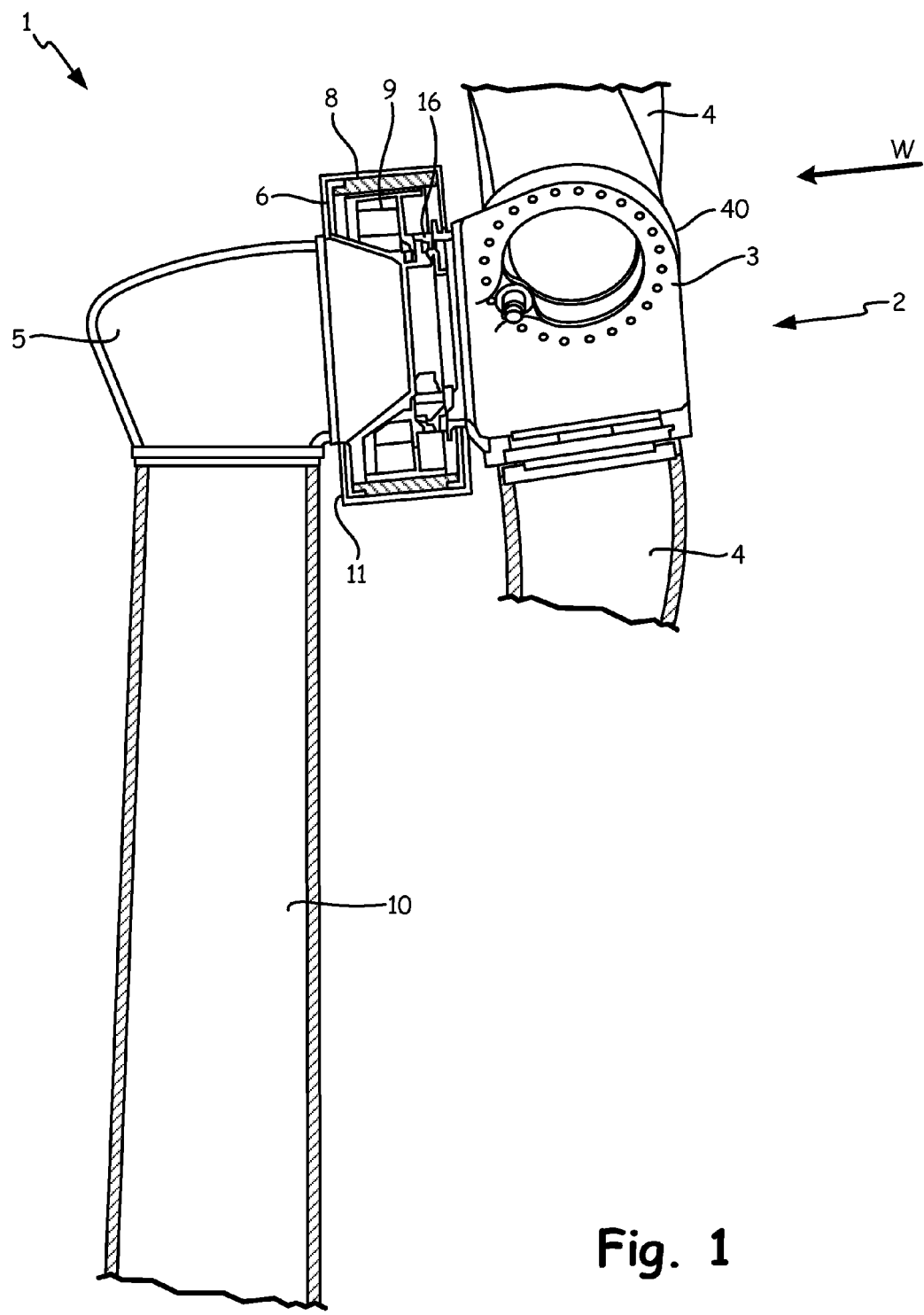
FIG. 1: shows a cross section of a wind turbine.

FIG. 1 is a cross section of an exemplary wind turbine 1. The wind turbine 1 comprises a rotor 2 with a rotatable hub 3. Attached to the hub 3 are three rotor blades 4. The wind turbine 1 comprises a nacelle 5 and a generator section 6. The generator section 6 comprises a stator 8 connected to the nacelle 5, and a generator rotor 9 connected to the hub 4 via a bearing ring 16. The nacelle 5 is mounted on top of a tower 10, supported by a ground surface such as a platform or sea bottom.

The nacelle 5 is rotatable by means of a yaw drive. During operation, the nacelle 5 is rotated to turn the rotor 2 towards the wind direction, indicated by arrow W in FIG. 1.

The generator section 6 is shown in more detail in FIG. 2. The generator section 6 comprises a nacelle side 7 bolted to the nacelle 5, and a hub side 12, bolted to the hub 3. A central hollow conical carrier 11 runs centrally through the generator section 6. The conical carrier 11 has a base 13 of a large diameter at the nacelle side 7 and a section 14 of a smaller diameter at short distance form the hub side 12. On the section 14 a cylindrical extension ring 15 is mounted forming the stationary race of a bearing surrounded by a cylindrical ring 16 forming a rotary bearing race of the bearing. A cylindrical flange 17 is mounted on one side of the cylindrical ring 16 to connect ring 16 to the hub 3. On the other side of ring 16, the ring 16 is bolted to an inwardly extending radial flange 18 of a cylindrical generator rotor 9. The cylindrical rotor 9 also comprises a second inwardly extending radial flange 20 at a distance from the first radial flange 18. The second radial flange 20 has a free outer end 21 facing a rib 22 on the outer wall of the conical carrier 11. The outer surface 23 of the cylindrical generator rotor 9 is provided with a series of parallel permanent magnets over its full circumference. A cylindrical stator 25 is provided with an inner surface 24 with windings, which faces the outer surface 23 of the rotor 9. Between the rotor outer surface 23 and the stator inner surface 24 is an air gap 26 with a radial length L. The cylindrical stator 25 is attached to a cylindrical exterior wall 27 capped at one end by a first radially extending ring shaped end wall 28 having its inner peripheral edge 29 connected to the base 13 of the conical carrier 11. At its other end the cylindrical exterior wall 27 is closed by a radially extending end wall 30, having an inner peripheral edge 31 with an air seal 32 to seal the interior of the generator section 6 against the ambient atmosphere.

Under the action of wind, the rotor blades 4 rotate the hub 3 and the generator rotor 9 to transfer kinetic energy from the wind into mechanical energy. Rotation of the permanent magnets on rotor 9 induces electrical voltage in the windings of stator 25. The obtained electric energy is subsequently fed into a utility grid.

The rib 22 comprises a top surface forming a stationary generator surface 35 facing an inner rotor surface 36 at the outer end 21 of flange 20. Between the inner rotor surface 36 facing a second stationary generator surface 35 is a second air gap 33. The length L' of the second gap 33 corresponds directly to the length L of the first gap 26 between the outer surface of cylindrical rotor 9 and the inner surface of the stator 25. When the length L of the first gap 26 becomes smaller, the length L' at the nearest point of the second gap 33 becomes larger, and the length L' at the most distant point of the second gap 33 becomes smaller. To monitor the length L of the first gap 26 without substantial interference by the magnetic field caused by the permanent magnets of the rotor 9, three sensors 34 are used to measure the distance between the outer end 21 of flange 20 and the rib 22 of the carrier 11 on three equidistantly arranged positions.

In the exemplary embodiment, wind turbine 1 is a gearless direct-drive wind turbine. Alternatively, the wind turbine can be a gearbox-driven wind turbine generator.

The pitch angle of a blade 4 is the angle that determines the blades orientation with respect to the direction of the wind. The pitch angle is controlled by a pitch drive in response to measured parameters, such as rotor speed, wind velocity and wind direction. Optionally, the pitch of each blade 4 can be controlled individually. For each blade 4 the pitch drive system comprises a pitch drive motor 40 and a transmission (not shown) enabling the motor 40 to rotate the blade 4 along its longitudinal axis via a bearing (not shown).

When wind force rotates the rotor with the blades 4, the blades 4 are subjected to centrifugal forces and various bending moments and stresses. The amount of force imparted to the blades 4 by wind and the rotational speed of the wind turbine rotor 2 can be modulated by adjusting the pitch angle of the blades 4.

A plurality of distance measurement sensors 34 are positioned in the second air gap 33 to measure the length of the gap 33. The sensors 34 can for example be capacitive proximity probes. The sensors 34 can be operatively connected to power and signal transmission cables.

While the second gap 33 remains substantially constant, the capacitance of the sensor 34 is also substantially constant and the sensor 34 transmits a substantially constant measuring signal. If the length of air gap 33 changes, the capacitance of the sensor 34 changes and the measuring signal transmitted from sensor 34 is altered.

The sensor 34 is configured to measure the radial length of the air gap 33 between the rib 22 and the outer end 21 of flange 20. The sensor 34 can communicate with a data processing unit 50 via a cable connection and/or wireless, e.g., via a network of transmitters and receivers operating in the radio frequency (RF) band may be used to define input channel. Optionally, Bluetooth® technology can be used. A junction box can be configured to receive a plurality of sensor cables.

The data processing unit can include one or more processors and a memory, an input channel 51, an output channel 52 and may include a computer, or similar type of programmable circuit. The output channel can for example be a cable, or a wireless network of transmitters and receivers operating in a predetermined portion of a radio frequency (RF) band.

The data processing unit 50 processes the distance measurement signals from the sensors 34. The memory of the data processing unit stores and transfers information and instructions to be executed by the processor.

The control system further includes a feedback channel 52 to the data processing unit. The feedback channel transmits information relating to pitch angles to the data processing unit 50.

In operation, bending loads and stresses within the blades 4 are induced by wind force. These loads are transferred from the blades 4 via the hub 3 and bearing ring 16 to generator rotor 9. In some instances, loads transferred into the generator rotor 9 deflect the generator rotor 9 such that dimensions of the air gap 26 change and predetermined tolerances are approached. The length of the second air gap 33 changes correspondingly. The sensors 34 monitor the length of the air gap 33 and transmit the measuring signal to the data processing unit 50. The measuring signal is typically a voltage or an electrical current signal converted to a dimension measurement by at least one resident conversion algorithm within the data processing unit 50.

The data processing unit 50 uses a resident comparator algorithm to compare this dimension measurement to a predetermined value. If any deviations are observed, the processors generate an adjustment signal which is converted to an output signal 52. The output signal 52 is transmitted to the blade pitch drive 40. The pitch drive 40 repositions the blades 4 to modulate the pitch angle which in turn modulates the amount of force imparted to the blades 4 by wind.

The pitch drive 40 transmits a feedback signal 53 to the data processing unit 50. In response, the data processing unit 50 modulates magnitude and duration of the output signal 52 transmitted to the pitch drive 40. As the blades pitch angle is changed, the blade loads change, which subsequently changes the loads transferred to the generator rotor 9. The length of the air gap 33 is measured throughout the process of blade pitch adjustment and the measuring signals transmitted to the data processing unit 50 facilitate modulation of the magnitude and duration of the output signal 52 transmitted to the pitch drive 40. When the length of air gap 33 is set to a predetermined value, the pitch drive 40 maintains the pitch angle of the blades 4.

What is claimed is:

1. A wind turbine comprising a generator with a generator rotor and a stator, with a first gap-between the stator and a first surface of the generator rotor and with magnets and electro-conductive windings at opposite sides of first gap, wherein the wind turbine comprises one or more distance measurement devices configured to measure the distance (L') between a second surface of the rotor and a stationary part of the generator free from magnets and windings at a radial distance from the first gap, wherein the second surface of the rotor facing the stationary generator surface forms a second gap, wherein the second gap has a length directly corresponding to the length of the first gap, wherein the one or more distance measurement devices are arranged to measure the radial length of the second gap.

2. The wind turbine according to claim 1 wherein the one or more distance measurement devices are positioned outside the scope of the magnetic field generated by the magnets to measure the distance (L') between the second surface of the rotor and the stationary part of the generator so as to reduce interference with a magnetic field generated by the magnets over the first gap.

3. The wind turbine according to claim 1 wherein the second surface of the rotor is formed on an inwardly extending flange of an inner surface of the rotor.

4. The wind turbine according to claim 1 wherein the stator comprises an inner surface facing the first surface of the generator rotor to form the first gap.

5. The wind turbine according to claim 1 wherein the distance (L') between the second surface of the rotor and the stationary part of the generator is measured at two or more locations.

6. The wind turbine according to claim 1 wherein the one or more distance measurement devices comprise a non-contact sensor.

7. The wind turbine according to claim 6 wherein each non-contact sensor is an inductive proximity sensor, a capacitive proximity sensor or an optical distance sensor.

8. The turbine according to claim 1 wherein the wind turbine comprises an air gap adjustment assembly configured to modulate a length of the first gap responsive to a signal from the one or more distance measurement devices.

9. The wind turbine according to claim 8 wherein the air gap adjustment assembly comprises a pitch drive control.

10. A method of monitoring the length of a first gap between magnets and electro-conductive windings on opposite surfaces of a rotor and a stator of a generator, wherein a gap length of the first gap is measured indirectly by measuring the length of at least one auxiliary second gap free of magnets and windings between a second surface of the rotor and a stationary surface of the generator at a distance from the first gap.

11. The method according to claim 10 wherein the distance between the first gap and the second gap is configured to reduce interference by magnetic fields generated by the magnets on distance measurement devices measuring a length of the second gap.

12. The method according to claim 10 wherein the length of the second gap is measured on at least three locations.

13. The method of claim 10, wherein measuring comprises disposing the one or more distance measurement devices outside the scope of the magnetic field generated by the magnets to measure the distance between the second surface of the rotor and the stationary part of the generator so as to reduce interference with a magnetic field generated by the magnets over the first gap.

14. The method of claim 10, wherein measuring comprises measuring the distance between the second surface of the rotor and the stationary part of the generator at two or more locations.

15. The method of claim 10, further comprising modulating a length of the first gap in response to a signal from a measuring device.

16. The method of claim 15, wherein modulating includes adjusting a pitch angle of one or more blades.

* * * * *